US 9,835,817 B2

(12) United States Patent
Burek et al.

(10) Patent No.: US 9,835,817 B2
(45) Date of Patent: Dec. 5, 2017

(54) TOOL FOR INSTALLING AN OPTICAL FIBER IN A BUILDING ROOM OR HALLWAY

(71) Applicant: OFS Fitel, LLC, Norcross, GA (US)

(72) Inventors: Denis E Burek, Cumming, GA (US); Jimmy Joy, Lawrenceville, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/937,255

(22) Filed: Nov. 10, 2015

(65) Prior Publication Data

US 2017/0160508 A1 Jun. 8, 2017

(51) Int. Cl.
G02B 6/44 (2006.01)
G02B 6/46 (2006.01)

(52) U.S. Cl.
CPC ............. G02B 6/46 (2013.01); G02B 6/4439 (2013.01); G02B 6/4466 (2013.01); B65H 2701/32 (2013.01)

(58) Field of Classification Search
CPC ...... G02B 6/46; G02B 6/4466; G02B 6/4439; B65H 2701/32
See application file for complete search history.

(56) References Cited

U.S. PATENT DOCUMENTS

| 8,792,766 B2 | 7/2014 | Hendrickson et al. |
| 8,906,178 B2 | 12/2014 | Burek et al. |
| 2013/0020015 A1* | 1/2013 | Dickinson ............ B65H 49/205 156/166 |

* cited by examiner

Primary Examiner — Ryan Lepisto
(74) Attorney, Agent, or Firm — Law Offices of Leo Zucker Esq.

(57) ABSTRACT

An installation tool and method of embedding an optical fiber in an adhesive bead deposited along a structural corner or crevice in a building room or hallway, without a ladder and while an installer stands safely on the floor. The tool includes a neck portion arranged to be joined to a distal end of a pole, a trough for receiving and containing the optical fiber, a guide channel disposed at a downstream end of the trough for retaining the fiber, and a tool nose disposed at a downstream end of the guide channel. When the installer manipulates the tool to sweep the tool nose over the bead while urging the tool nose against the bead, the fiber enters the tool nose from the guide channel and becomes embedded in the adhesive bead.

19 Claims, 4 Drawing Sheets

TOOL FOR INSTALLING AN OPTICAL FIBER IN A BUILDING ROOM OR HALLWAY

BACKGROUND OF THE INVENTION

Field of the Invention

The present invention relates to the installation of optical fibers in building rooms and hallways for providing communication services to occupants, and particularly to a tool that facilitates such installations.

Discussion of the Known Art

In a known procedure for installing an optical fiber inside a user's premises to provide communication services (e.g., voice, data, and Internet access), the fiber is hidden from view as much as possible by routing it along or inside existing structural corners or crevices in each room of the installation, for example, between a crown or floor molding and a wall, or directly between the wall and the ceiling or floor. Before placing a fiber at or near the ceiling, an installer climbs a ladder or step stool, and uses a hand tool to deposit an epoxy adhesive bead of about 0.1 inch diameter in the selected corners or crevices along the installation path.

For a typical ceiling installation, the installer must move and climb the ladder ten or more times to deposit the adhesive bead at all of the selected locations. After depositing the bead, the installer repositions and climbs the ladder again, and uses a finger to embed a length of the fiber within the installer's safe reach into the bead. Next, the installer moves and climbs the ladder again as often as necessary to embed the fiber in the bead over the entire path of the installation. As a result, furniture at the premises must be temporarily set aside to clear a path for the ladder each time the ladder is repositioned.

Tools are also known that work to apply or activate an adhesive coating on an optical fiber, and to apply the coated fiber onto a structural surface after which the fiber bonds to the surface when the adhesive coating dries or cures. See U.S. Pat. No. 8,792,766 (Jul. 29, 2014), and U.S. Pat. No. 8,906,178 (Dec. 9, 2014), both of which are assigned to the assignee of the present application and are incorporated by reference.

In view of the above, there is a need for a tool that enables an installer to embed an optical fiber or cable in an adhesive bead deposited along structural corners or crevices in a building room or hallway, regardless of the height of the bead, and while the installer stands safely on the floor and does not require a ladder or other means to elevate him or her to the height of the bead.

SUMMARY OF THE INVENTION

According to the invention, an installation tool for an optical fiber has a neck portion arranged to be attached to a distal end of a pole, a trough for receiving and containing a length of an optical fiber to be embedded in an adhesive bead deposited along or inside a structural corner or crevice in a building room or hallway, and a guide channel disposed at a downstream end of the trough for retaining the fiber. An elongated tool nose is disposed at a downstream end of the guide channel. The tool nose is configured so that when the tool is manipulated to sweep the tool nose over the adhesive bead while the nose is urged against the bead, the fiber enters the nose from the guide channel and becomes embedded in the bead.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
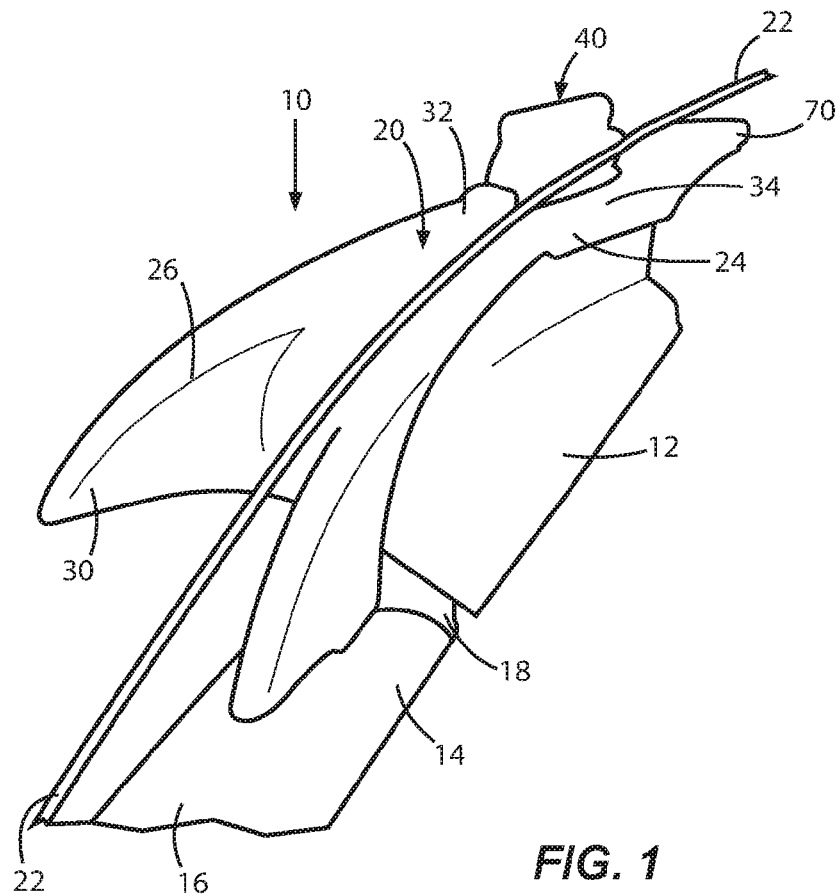
FIG. 1 is a perspective view of an optical fiber installation tool according to the invention, as seen from one side of the tool.
Figure 2:
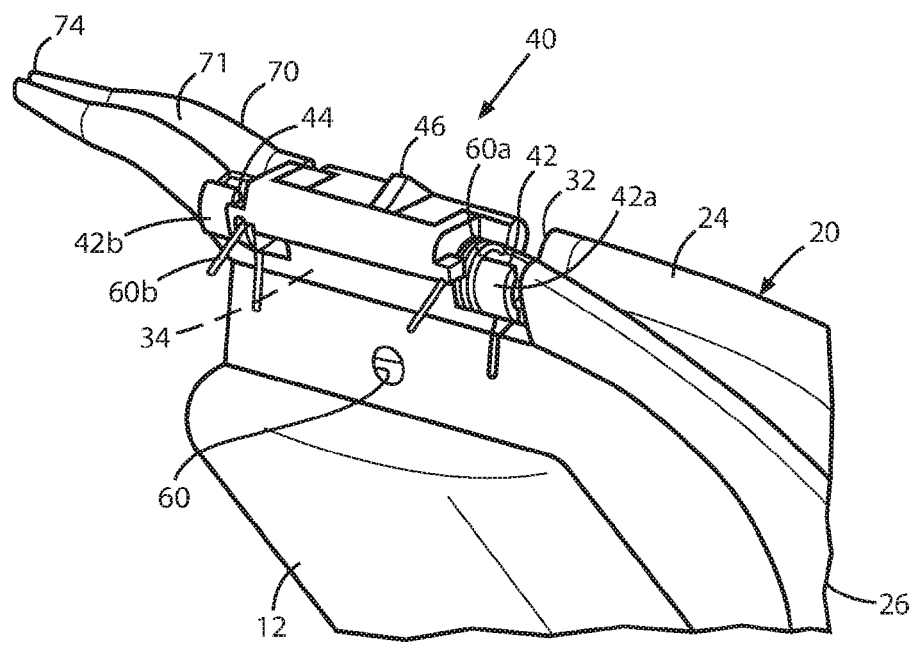
FIG. 2 is a perspective view of the inventive tool as seen from an opposite side of the tool in FIG. 1.

FIG. 1 is a perspective view of an installation tool 10 for an optical fiber according to the invention as seen from a right side of the tool 10, and FIG. 2 is a perspective view of the tool 10 as seen from the left side of the tool. As used herein, the term "optical fiber" is intended to mean either a single optical fiber of the kind installed inside a residence or a living unit in a multi-dwelling building to provide media and communication services, or an optical cable of the kind installed in a building hallway and which contains a number of optical fibers that are assigned to multiple living units in the building.

The tool 10 can be formed from a general purpose, injection moldable thermoplastics material such as, e.g., acrylonitrile butadiene styrene (ABS). The tool includes a neck portion 12 that is or can be attached to a distal end 14 of an elongated pole 16 (see FIGS. 1 and 4). In the illustrated embodiment, the pole 16 has a threaded end cap 18 at its distal end 14, and tool neck portion 12 of the tool has a threaded socket for receiving the end cap 18. Thus, the pole 16 can be removed from the tool 10 when the tool is not in use. Either fixed length or telescoping poles may be used with the tool 10, including conventional poles intended for attachment to paint rollers, window squeegees, and the like.

Figure 3:
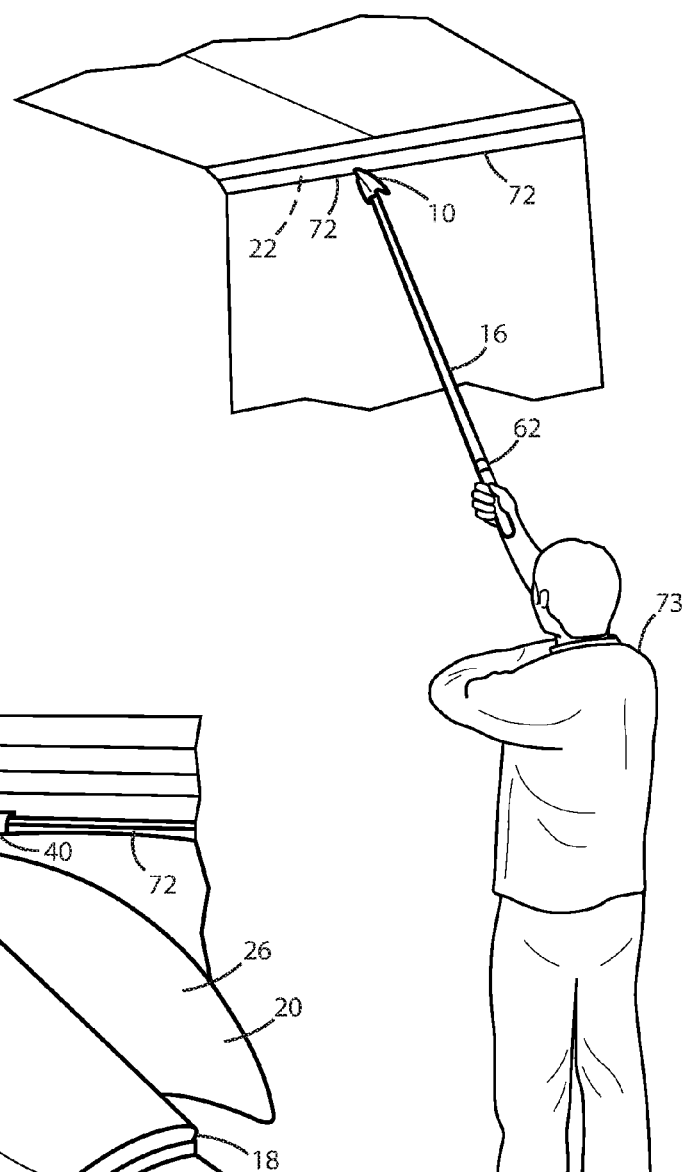
FIG. 3 illustrates an installer using a pole to manipulate the inventive tool to embed an optical fiber in an adhesive bead deposited along a corner formed between wall and a crown molding.

For example, the pole 16 may be adjustable in length between three and six feet. With the pole 16 set at three feet, the tool 10 may be used by an installer to embed an optical fiber in an adhesive bead deposited along a corner formed, e.g., between a wall and a floor molding. With the pole 16 set at six feet, the tool 10 may be used to embed an optical fiber in a bead deposited along a corner formed, e.g., between a wall and a crown molding. (See FIGS. 3 and 4). And, depending on the distance from the installer, the pole 16 may be adjusted to use the tool 10 to embed an optical fiber in an adhesive bead deposited next to an existing conduit or cable fastened along a wall of a building room or hallway.

As shown in FIG. 1, the tool 10 also includes a trough 20 having a generally V-shaped cross section for receiving and containing a length of an optical fiber 22 to be embedded in an adhesive bead deposited, for example, at or near a ceiling in a room or hallway. The trough 20 is defined by a pair of opposed, wing shaped side walls 24, 26, wherein the spacing between the side walls 24, 26 decreases from an upstream end 30 toward a downstream end 32 of the trough. When the tool 10 is used as described below, the fiber 22 is received and contained by the trough 20 as the fiber advances toward the downstream end 32 of the trough.

A narrow guide channel 34 is formed in the body of the tool 10 to receive the optical fiber 22 as it exits from the downstream end 32 of the trough 20, and to retain the fiber within the channel. The guide channel 34 is sufficiently wide and deep to accommodate the fiber 22 and allow the fiber to advance smoothly inside the channel 34 when the channel is closed by a fiber keeper 40.

Figure 6:
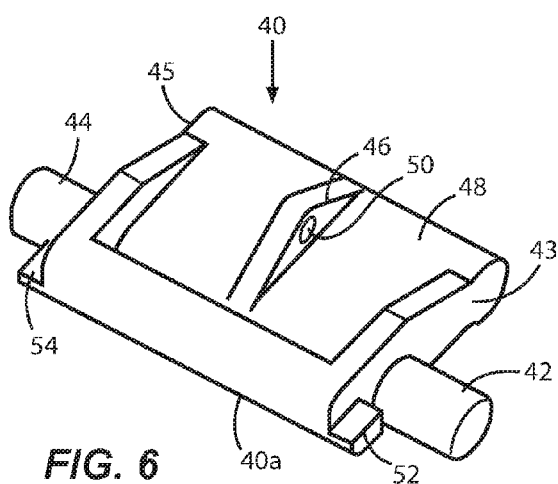
FIG. 6 is an isometric view of a fiber keeper on the tool, as seen from the top of the keeper.
Figure 7:
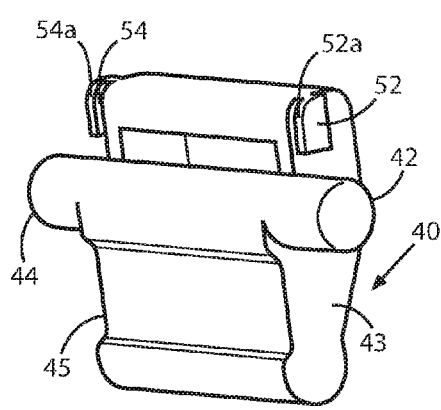
FIG. 7 is an isometric view of the keeper as seen from the bottom of the keeper.

As viewed in FIGS. 6 and 7, the fiber keeper 40 has a generally rectangular body, and axially aligned pivots 42, 44 that project from opposite side ends 43, 45 of the keeper 40 in the vicinity of a long edge 40a of the keeper. As seen in FIG. 2, the pivots 42, 44 are secured for rotational movement by corresponding "C" shaped clips 42a, 42b that are formed on the tool body near both ends of the guide channel 34.

The fiber keeper 40 also has a pair of axially aligned tabs 52, 54 that project from the side ends 43, 45 of the keeper near the pivots 42, 44, as shown in FIGS. 6 and 7. The tabs 52, 54 have bottom surfaces that are slotted at 52a, 52b (see FIG. 7), next to the side ends 43, 45 of the keeper 40. Before the pivots 42, 44 are inserted in the clips 42a, 42b, and as seen in FIG. 2, coiled bias springs 60a, 60b are placed about the pivots, and one end of each spring is seated in the bottom slot in the corresponding tab. An opposite end of each spring is inserted in a hole in the tool body to fix the position of the opposite end. When so arranged, the springs 60a, 60b exert a bias force that urges the keeper 40 to swing toward a closed position atop the guide channel 34 as shown in FIG. 2, thus retaining the fiber 22 inside the channel 34.

Figure 5:
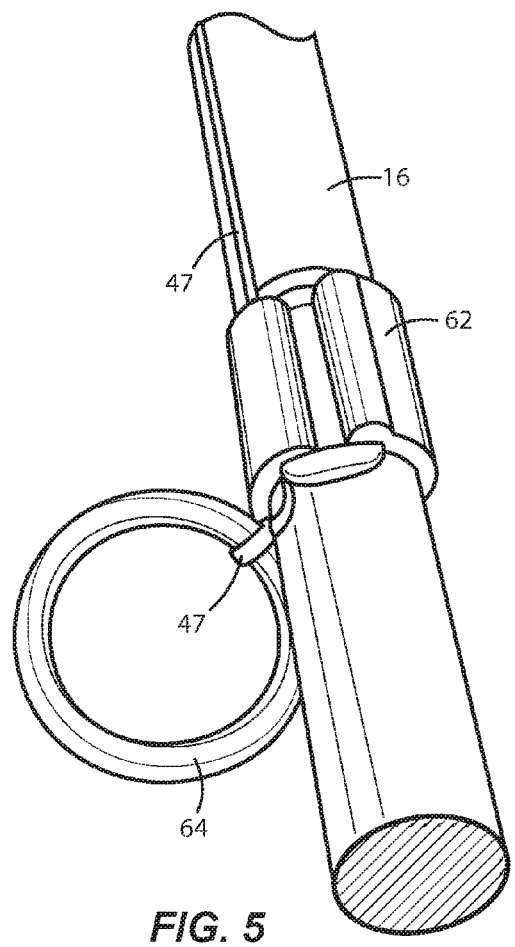
FIG. 5 is a view of an end length of a cord and a handle secured to the pole for access by the installer while using the tool.

The fiber keeper 40 also has a raised flange 46 on a top side 48 of the keeper, intermediate the side ends 43, 45. See FIGS. 2 and 6. The flange 46 has an opening 50 through which one end of a cord 47 is tied to the flange. The cord 47 is routed from the flange opening 50, over the left side of the keeper 40 as viewed in FIG. 2, through another opening 60 above the neck portion 12 of the tool 10, and down the pole 16. As seen in FIG. 5, the cord is retained by a Velcro® or like band 62 tied about a near or proximal end of the pole 16. The opposite end of the cord 47 is tied to a handle 64 in the form of a ring or other convenient shape for grasping by an installer. Thus, by holding the pole 16 and pulling the handle 64 downward, the installer can open the keeper 40 atop the guide channel 34 either to capture a length of fiber in the channel and retain the fiber in the channel upon releasing the handle, or to set free a length of fiber remaining in the channel 34 after the tool has been used.

Figure 4:
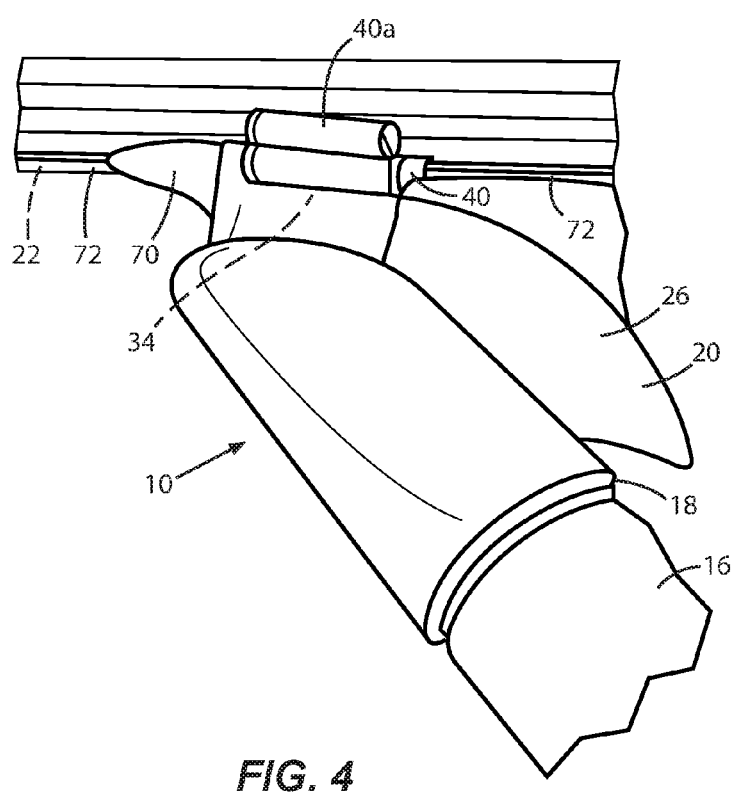
FIG. 4 is an enlarged view of the inventive tool being swept over the adhesive bead in FIG. 3.

An elongated tool nose 70 is disposed at a downstream end of the guide channel 34 as shown in FIGS. 1, 2, and 4. The tool nose 70 has an axial groove 71 for receiving the fiber 22 as the fiber exits the downstream end of the guide channel 34 while the tool 10 is in use. The groove 71 is aligned with the long axis of the pole 16 when the pole is attached to the neck portion 12 of the tool 10, as in FIGS. 1 and 4. When an installer 73 manipulates the tool 10 via the pole 16 to sweep the tool nose 70 over the deposited bead 72 while urging the nose against the bead (see FIGS. 3 and 4), the fiber 22 exits the guide channel 34, enters the groove 71 in the tool nose, and the tool nose embeds the fiber in the bead 72.

Figure 8:
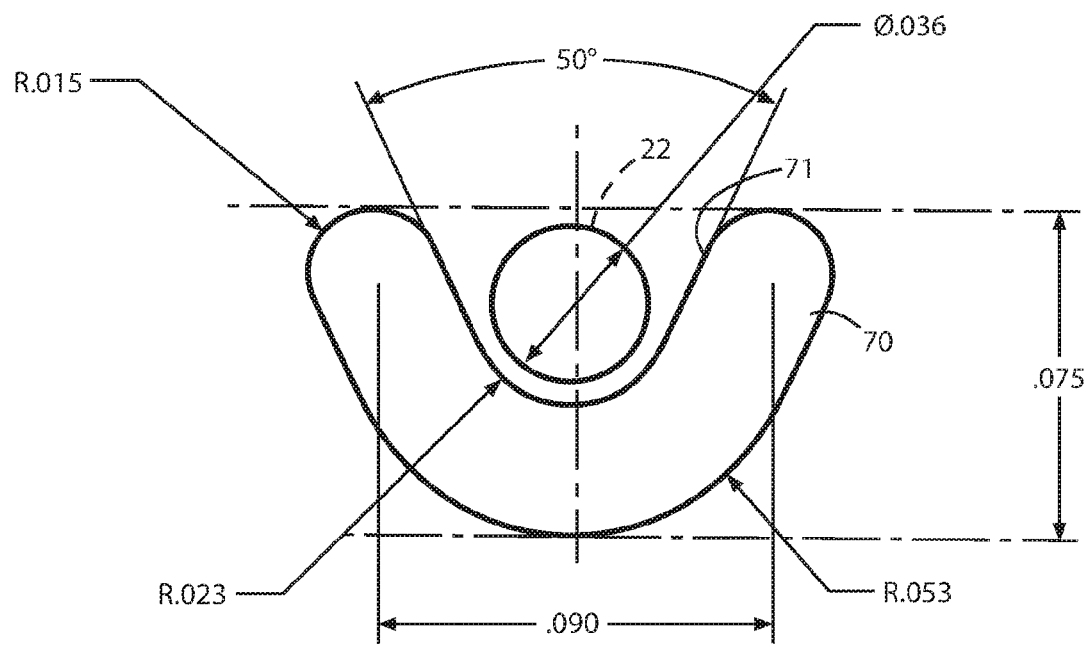
FIG. 8 is an end view of a nose of the inventive tool, with dimensions for embedding an optical fiber having an outer diameter (OD) of 900 microns.
Figure 9:
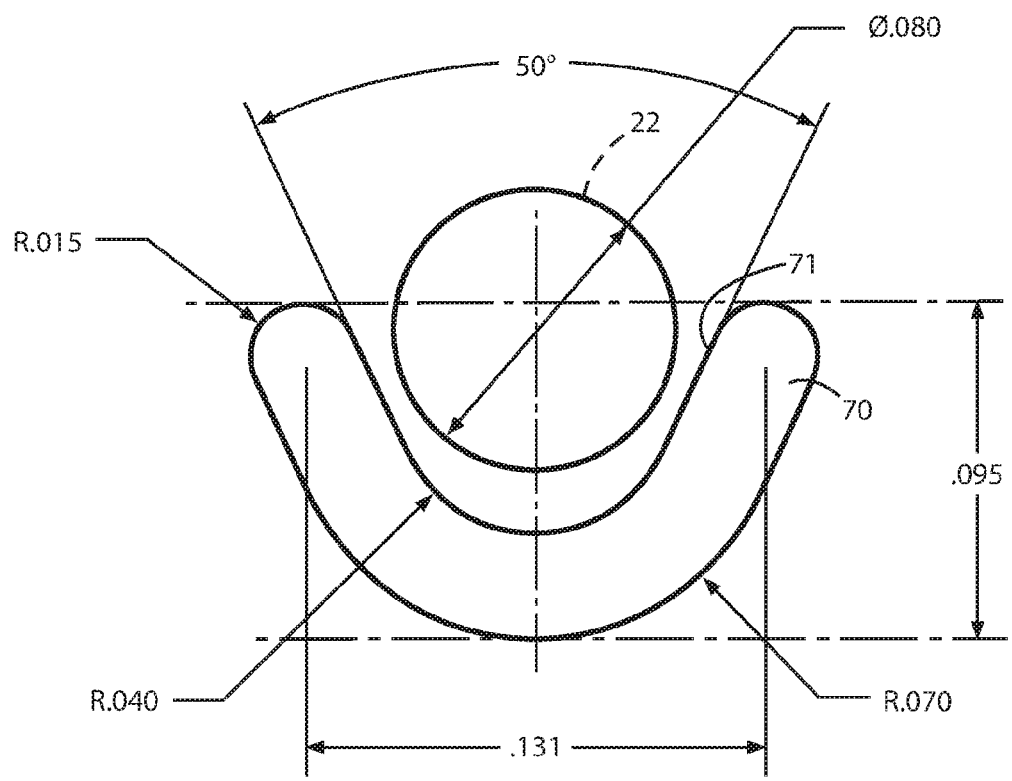
FIG. 9 is an end view of the tool nose, with dimensions for embedding an optical fiber having an OD of 2.0 mm.

FIG. 8 is a view facing the open end 74 of the tool nose 70 (see FIG. 2), showing dimensions, in inches, of the groove 71 in the tool nose suitable for embedding the fiber 22 in the adhesive bead 72 when the OD of the fiber is 900 μm and the OD of the bead 72 is about 0.100 inch. FIG. 9 is a view similar to FIG. 8, showing dimensions for the groove 71 for embedding the fiber 22 in the bead 72 when the fiber has an OD of 2.0 mm.

A typical installation with the inventive tool 10 may proceed as follows:

1. The adhesive bead 72 is deposited along selected structural corners and crevices in rooms or halls through which the fiber 22 is to be routed.

2. The fiber keeper 40 atop the guide channel 34 is held open by the installer, and a length of the fiber 22 to be embedded in the bead 72 is guided by the installer through the trough 20, the guide channel 34, and the groove 71 in the tool nose 70.

3. The installer allows the keeper 40 above the guide channel 34 to close and thus retain the fiber 22 in the channel.

4. The installer places the tool nose 70 via the pole 16 at a determined start position along the bead, using one hand to hold the pole 16 and using the other hand to hold the fiber. This helps to avoid undesirable fiber slack from accruing along the installation path.

5. The installer sweeps the tool nose 70 over the bead via the pole 16 while urging the nose against the bead to embed the fiber 22.

6. When reaching a determined end position along the bead 72, the installer opens the keeper 40 to release the fiber from the guide channel 34. Any remaining loose fiber is otherwise secured over the routing path.

As disclosed herein, the overall dimensions of the inventive tool 10 may be approximately 4.0 inches long, by 1.5 inches wide, by 2.5 inches high. The fiber keeper 40 alone may be approximately 0.90 inch long, by 0.50 inch wide, by 0.22 inch high.

While the foregoing represents preferred embodiments of the present invention, it will be understood by persons skilled in the art that various changes, modifications, and additions can be made without departing from the spirit and scope of the invention. and that the invention includes all such changes, modifications, and additions as are within the bounds of the following claims.

We claim:

1. An installation tool for an optical fiber, comprising:
   a neck portion configured to be attached to a distal end of an elongated pole;
   a trough joined to the neck portion for receiving and containing a length of an optical fiber to be embedded by the tool in an adhesive bead deposited along a structural corner or crevice formed in a building room or hallway;
   a guide channel having an upstream end disposed at a downstream end of the trough for retaining the optical fiber;
   a tool nose disposed at a downstream end of the guide channel, wherein the tool nose is configured and dimensioned so that when the tool is manipulated to sweep the tool nose over the adhesive bead while the tool nose is urged against the bead, the optical fiber enters the tool nose from the guide channel and the tool nose embeds the fiber in the bead; and a fiber keeper associated with the guide channel, wherein the keeper is arranged for movement between a closed position atop the guide channel to retain the optical fiber inside the channel, and an open position so that an outside length of fiber can be captured and retained by the channel, or a length of fiber remaining in the guide channel can be released from the tool.

2. An installation tool according to claim 1, wherein the fiber keeper is constructed and arranged for swinging movement between the closed and the open positions.

3. An installation tool according to claim 2, wherein the fiber keeper has an associated spring mechanism for biasing the keeper toward the closed position atop the guide channel.

4. An installation tool according to claim 3, wherein the fiber keeper has a flange on a top side of the keeper, and including a cord having one end tied to the flange, and a handle attached to an opposite end of the cord for pulling the cord and swinging the keeper to the open position.

5. An installation tool according to claim 4, including a band for mounting a proximal end of the cord including the handle along the pole for access by an installer.

6. A method of installing an optical fiber, comprising:
depositing an adhesive bead along a selected structural corner or crevice formed in a building room or hallway in which the optical fiber is to be installed;
providing an installation tool according to claim 4;
providing an elongated pole, and fastening a distal end of the pole to the installation tool;
holding the fiber keeper atop the guide channel of the installation tool open, and guiding a length of an optical fiber to be embedded in the bead through the trough, the guide channel, and the nose of the tool;
closing the fiber keeper, thus retaining the fiber in the guide channel;
placing the tool nose at a determined start position along the deposited adhesive bead; and
sweeping the tool nose over the adhesive bead while urging the nose against the bead to em bed the fiber.

7. The method of claim 6, including opening the fiber keeper to release the fiber from the guide channel after the sweeping step.

8. The method of claim 6, wherein the sweeping step is performed by an installer holding the pole with one hand and holding the length of optical fiber to be embedded in the adhesive bead with the other hand, thereby avoiding undesirable fiber slack from accruing as the tool nose em beds the fiber in the bead.

9. The method of claim 6, wherein the selected corner or crevice in the depositing step is adjacent to a crown molding or a baseboard molding on a wall of the building room or hallway in which the optical fiber is to be installed.

10. The method of claim 6, wherein the selected corner or crevice in the depositing step is between a wall and a ceiling or a wall and a floor of the building room or hallway in which the optical fiber is to be installed.

11. The method of claim 6, wherein the selected corner or crevice in the depositing step is next to an existing conduit or cable fastened along a wall of the building room or hallway in which the optical fiber is to be installed.

12. An installation tool according to claim 1, wherein the tool nose is configured to embed an optical fiber having an outer diameter (OD) of about 900 µm into an adhesive bead having an OD of about 0.1 inch.

13. An installation tool according to claim 1, wherein the tool nose is configured to embed an optical fiber having an OD of about 2.0 mm into an adhesive bead having an OD of about 0.1 inch.

14. An installation tool according to claim 1, wherein the trough has a generally V-shaped cross section.

15. An installation tool according to claim 1, wherein the neck portion of the tool has a socket for receiving and engaging a distal end of the pole.

16. An installation tool for an optical fiber, comprising:
a neck portion configured to be attached to a distal end of an elongated pole;
a trough joined to the neck portion for receiving and containing a length of an optical fiber to be embedded by the tool in an adhesive bead deposited along a structural corner or crevice formed in a building room or hallway;
a guide channel having an upstream end disposed at a downstream end of the trough for retaining the optical fiber;
a tool nose disposed at a downstream end of the guide channel, wherein the tool nose is configured and dimensioned so that when the tool is manipulated to sweep the tool nose over the adhesive bead while the tool nose is urged against the bead, the optical fiber enters the tool nose from the guide channel and the tool nose embeds the fiber in the bead;
wherein the trough has a generally V-shaped cross section; and
the trough is defined by a pair of opposed, wing shaped side walls the spacing between which decreases from an upstream end toward the downstream end of the trough.

17. An installation tool according to claim 16, wherein the tool nose is configured to embed an optical fiber having an outer diameter (OD) of about 900 µm into an adhesive bead having an OD of about 0.1 inch.

18. An installation tool according to claim 16, wherein the tool nose is configured to embed an optical fiber having an OD of about 2.0 mm into an adhesive bead having an OD of about 0.1 inch.

19. An installation tool according to claim 16, wherein the neck portion of the tool has a socket for receiving and engaging a distal end of the pole.

* * * * *